US011881125B2

(12) United States Patent
Lamb et al.

(10) Patent No.: US 11,881,125 B2
(45) Date of Patent: Jan. 23, 2024

(54) LABELS WITH LINER SEPARATION FEATURE

(71) Applicant: Iconex LLC, Duluth, GA (US)

(72) Inventors: Shane Lamb, Bulls Gap, TN (US); Timothy Darren Livingston, Corryton, TN (US)

(73) Assignee: Iconex LLC, Duluth, GA (US)

( * ) Notice: Subject to any disclaimer, the term of this patent is extended or adjusted under 35 U.S.C. 154(b) by 0 days.

(21) Appl. No.: 17/163,035

(22) Filed: Jan. 29, 2021

(65) Prior Publication Data

US 2022/0246066 A1 Aug. 4, 2022

(51) Int. Cl.
*G09F 3/00* (2006.01)
*G09F 3/10* (2006.01)
*G09F 3/02* (2006.01)
*B31D 1/02* (2006.01)

(52) U.S. Cl.
CPC ........... *G09F 3/0292* (2013.01); *B31D 1/021* (2013.01); *B31D 1/026* (2013.01); *G09F 3/10* (2013.01); *B31D 2201/02* (2013.01); *G09F 2003/0222* (2013.01); *G09F 2003/0229* (2013.01); *G09F 2003/0267* (2013.01); *G09F 2003/0277* (2013.01)

(58) Field of Classification Search
None
See application file for complete search history.

(56) References Cited

U.S. PATENT DOCUMENTS

| | | | |
|---|---|---|---|
| 5,524,934 | A | 6/1996 | Schwan et al. |
| 5,660,925 | A | 8/1997 | Cooley et al. |
| 5,810,397 | A | 9/1998 | Mehta et al. |
| 5,884,425 | A | 3/1999 | Baldwin |
| 5,970,875 | A | 10/1999 | Hoffmann et al. |
| 6,413,604 | B1 | 7/2002 | Matthews et al. |
| 6,447,015 | B1 | 9/2002 | Linnewiel |
| 7,878,410 | B2 | 2/2011 | Norrby et al. |
| 11,158,213 | B2 | 10/2021 | Shinkle, II et al. |
| 2005/0230961 | A1 | 10/2005 | Walley |
| 2007/0275133 | A1 | 11/2007 | Sierra-gomez et al. |
| 2009/0015649 | A1 | 1/2009 | Keeton et al. |

(Continued)

FOREIGN PATENT DOCUMENTS

| | | | |
|---|---|---|---|
| CA | 2134521 | A1 | 5/1995 |
| GB | 2179910 | A | 3/1987 |

(Continued)

*Primary Examiner* — Laura C Powers
(74) *Attorney, Agent, or Firm* — Schwegman Lundberg& Woessner, P.A.

(57) ABSTRACT

A liner in a label-liner combination is provided with a die cut portion made in the liner. The die cut portion is aligned with at least one edge in a label and a front side of the liner is attached to a backside of the label. The die cut portion of the liner is adapted to be removed from the liner when the label is removed from the label-liner combination. Dimensions, and orientation, and a location of the die cut portion in the liner are adapted to allow the label to be removed from the label-liner combination and applied to a surface by digits of a hand without touching an adhesive coating on the backside of the label and adapted to maintain proper printer waste liner spool operations when the liner is wound after application of the label.

14 Claims, 5 Drawing Sheets

(56) References Cited

U.S. PATENT DOCUMENTS

| | | | | |
|---|---|---|---|---|
| 2009/0145540 | A1* | 6/2009 | Francoeur | G09F 3/0288 428/40.1 |
| 2010/0132606 | A1 | 6/2010 | Hagmaier | |
| 2010/0233412 | A1* | 9/2010 | Wong | G11B 23/40 428/47 |
| 2010/0237605 | A1 | 9/2010 | Vidler et al. | |
| 2012/0128835 | A1 | 5/2012 | Lyzenga et al. | |
| 2012/0249624 | A1 | 10/2012 | Roth et al. | |
| 2012/0280483 | A1 | 11/2012 | Jeske et al. | |
| 2015/0161915 | A1 | 6/2015 | Wild | |
| 2017/0236453 | A1 | 8/2017 | Berbert et al. | |
| 2017/0352299 | A1 | 12/2017 | Amron | |
| 2019/0228682 | A1 | 7/2019 | Francoeur et al. | |
| 2020/0365061 | A1 | 11/2020 | Shinkle, II et al. | |
| 2021/0251628 | A1 | 8/2021 | Leung et al. | |
| 2022/0005380 | A1 | 1/2022 | Shinkle, II et al. | |

FOREIGN PATENT DOCUMENTS

| | | | |
|---|---|---|---|
| SE | 528869 | C2 | 3/2007 |
| WO | WO-9119231 | A1 | 12/1991 |
| WO | 2015017494 | | 2/2015 |
| WO | WO-2022031799 | A1 | 2/2022 |

* cited by examiner

LABELS WITH LINER SEPARATION FEATURE

BACKGROUND

The COVID19 pandemic has identified a litany of merchant processes and products where health safety is a concern for the merchant, the merchant's employees, and the merchant's customers. Face-to-face merchant to customer interactions have been reduced with revised processes and common touched surfaces are now regularly sanitized.

Consumers have changed their behaviors as well and are frequenting those merchants that are health safety conscious. In fact, demand for online ordering (food and products) has exploded during the pandemic so much so that merchants cannot keep up with the demand.

Many merchant offered services and products now include safety labels as proof to the consumers that their food service items, products, or hotel rooms have not been tampered with and/or have been sanitized. However, these safety labels can create additional issues for the merchants.

For example, a dine-in restaurant, which previously did a few carryout orders a week requiring a few labels is now experiencing nearly all carryout orders with little to no dine-in customers requiring a plentiful supply of label media. This means that the staff is now primarily focused on food preparation and packaging for delivery or pickup. Handling of food items requires safety gloves be worn by the staff but the food packager can waste a pair of safety gloves each time an order is packaged because the glove sticks to the adhesive on the back of the label when the label is separated from its liner.

A glove stuck to a label may rip/tear the label when the packager attempts to separate the glove from the label adhesive, or the glove may rip/tear leaving a piece of the glove on the label. This usually requires the label to be reprinted (especially when the label is a safety label that includes tamper evident features, which intentionally weaken portions of the label so that the label cannot be taken off and reapplied to the food packaging after the label was initially applied to the packaging).

This is not only wasteful but time consuming and expensive for the merchant.

SUMMARY

In various embodiments, labels and rolls of labels with separation features are provided.

Specifically, and in an embodiment, a label-liner combination with a separation feature is provided.

DETAILED DESCRIPTION

FIG. 1A is a diagram of a label-liner combination 100 with a separation feature, according to an example embodiment, according to an example embodiment.

As used herein the term "media" may be used synonymously and interchangeably with the phrase "print media." Print media comprises a substrate for which at least one side includes a deposited print coating or image coating. The substrate of the media may comprise a paper-based material and/or a synthetic-based material. The print coating enables dot matrix or laser-based printing of custom indicia. The image coating enables thermal imaging either through direct thermal heat or through terminal transfer heat selectively applied on the surface of the media having the image coating. The media also may include preprinted branding or designs that is Ultra-Violet (UV) flexo printed during the manufacturing process.

A "liner" comprises a backing or a sheet of material to which the print media (label) is initially adhered to. Typically, the "liner" or "release liner" is a paper-based and/or a plastic based film applied to the backside of the print media during manufacture of a label-liner combination and designed to prevent adhesive coated on the backside of the print media from prematurely adhering to an object before a label associated with the print media is affixed to an object during application. A front side of the liner may also be coated with a release agent or release coating, which prevents the adhesive on the backside of the print media from adhering and/or prematurely activating until the label is separated from the label-liner combination for application.

One or more "labels" may be manufactured using a single sheet of liner as a roll of label-liner combinations or one or more labels may be manufactured using individual sheets of a liner (as used herein and below, the phrase "label-liner combination" may be used synonymously and interchangeably with the phrase "liner-label" combination).

Figure 1:
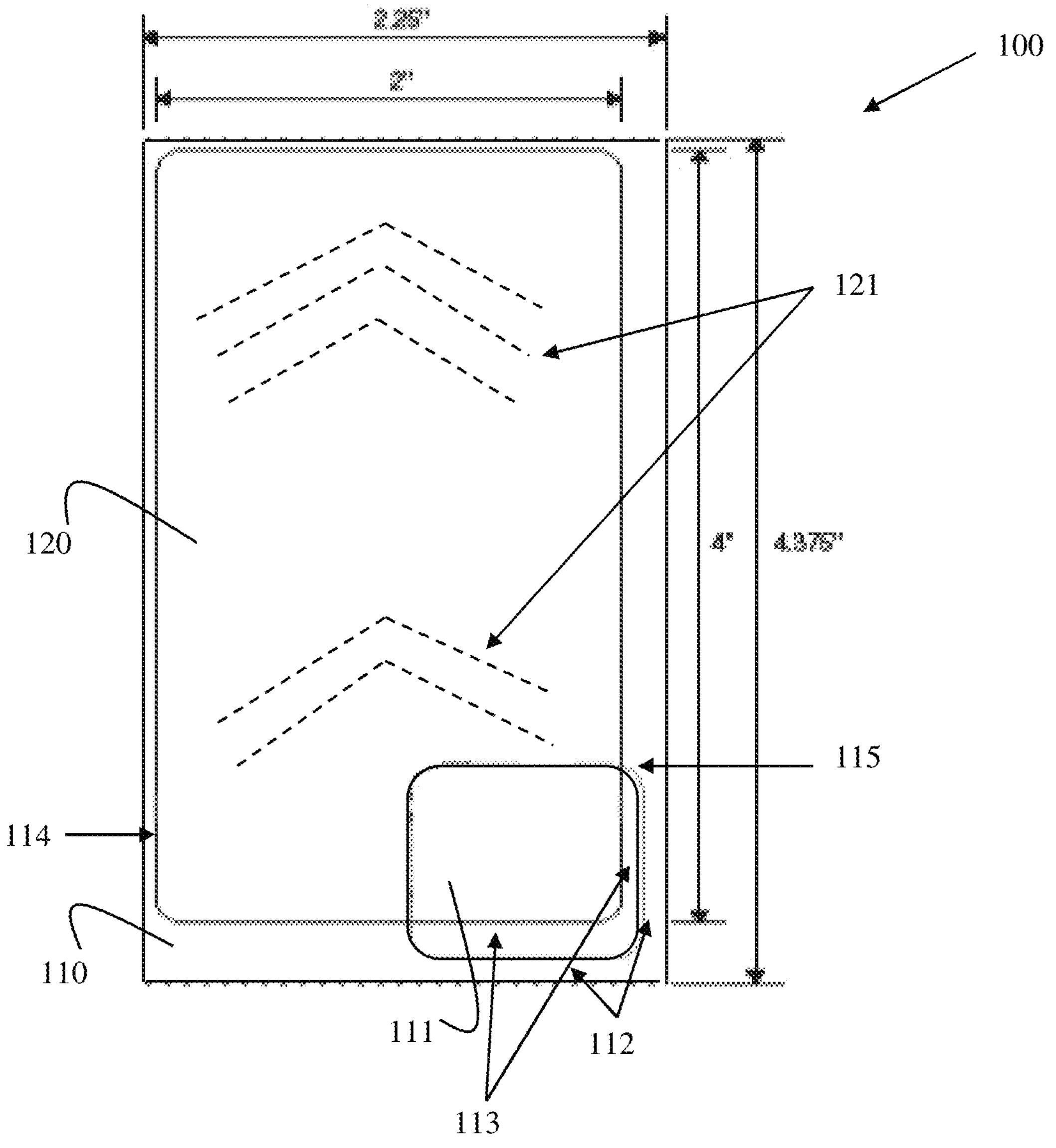
FIG. 1 is a diagram of a label-liner combination with a separation feature, according to an example embodiment.

Referring now to the label-liner combination 100 ("combination 100") of FIG. 1.

The label 120 may or may not comprise die cuts or back cuts 121 within the substrate of the print media. ("Die cuts 121" may also be referred to as "back cuts 121" and/or "perforations 121.") These die cuts 121 provide tamper evident features for label 120 by weakening the substrate of the label 120 along the die cuts 121 such that when the label 120 is removed from liner 110 and adhered to an object (bag, box, door slits, toilet seats, bottle lids/caps, etc.) the label 120 is damaged (torn or ripped) along the die cuts 121, which provides visual evidence that the object was opened or used. This is particularly useful during the COVID19 pandemic by providing intended recipients of the object or users of the object with verifiable visible evidence that the object was not tampered with or used by anyone after the label 120 was initially applied.

Liner 110 comprises a die cut made within the liner substrate representing die cut portion 111 in liner 110. The die cuts associated with portion 111 is aligned to one or more edges of both the liner 110 and the label 120. This provides a unique glove-friendly separation feature for the label 120 of combination 100. When label 120 is separated from liner 110 for application by a merchant, the user grabs or provides a slight push downward (using a thumb or gloved thumb) at a corner associated with die cut portion 111 causing an edge of label 120 to be removed from the combination 100 with a separated portion 111 remaining affixed to that edge of label 120 after label 120 removal from combination 100.

This leaves a hole or an aperture in the remaining liner 110 that is wound by the printer for subsequent discard or recycling.

The user can then apply the label 120 to an object by grasping the removed label 120 in the gloved hand while pinched between two fingers or a finger and a thumb (digits of a hand) from a front side of label 120 and a backside of the liner 110 corresponding to removed portion 111 of liner 110. The backside of the removed label 120 that does not correspond to the attached portion 111 comprises adhesive, such that as the user handles the removed label 120 there is no contact between the adhesive and the user's hand (gloved or ungloved). The label 120 can then be applied to the desired object and using the control hand a small area 113 of portion 111 that extends beyond an outer edge of label 120 can be grasped and used to peel portion 111 off of the label 120. The entire label separation from combination 100 and label application process can be achieved with one user's hand without any portion of the user's gloved or ungloved hand coming in contact with the adhesive coating on the backside of label 120.

This provides a superior feature (via portion 111) to combination 100, which is presently not available in the industry and which is especially relevant during the COVID19 pandemic as discussed above.

The size (dimensions), location, and orientation of die cuts for portion 111 relative to the edges of the liner 110 and edges of the label 120 are of import for a variety of reasons.

For instance, when label 120 is imaged or printed on by a printer (thermal, laser, or dot matrix), the liner 110 remains in the printer and is automatically wound into a discard roll as each label 120 is removed from label-liner roll 130 (see FIG. 4) for application by a merchant. The discarded or used portions of the liner 110 are then removed from a printer spool as a discard liner roll and discarded/recycled. However, should the substrate of the liner 110 become too weakened or out of proper alignment, the discarded or used portion of the liner 110 may not automatically feed back into the printer spool resulting in a malfunction of the printer, which requires attention by an attendant to re-feed and re-align the liner into its spool. Consequently, the size, location, and orientation of remaining holes in liner 110 created when portions 111 are removed from combination 100 can cause feed problems in the printer for the spool or roll associated with the discarded remaining liner 110.

In another instance, when labels 120 comprise tamper-evident die cuts 121, the size, location, and orientation of die cuts for portion 111 relative to those tamper-evident die cuts are of import because removal of label 120 with portion 111 from combination 100 can result in a tear in the label 120 along one or more of the die cuts 121 causing label 120 to be unusable for its intended purpose. Consequently, remaining holes in liner 110 created when portions 111 are removed from combination 100 can cause destruction of a label 120 having tamper-evident die cuts 121.

Thus, dimensions (size), location, and orientation of the die cut portion 111 within a liner web directly correlates with the structural and operational integrity of a remaining waste portion of the liner web by a printer and also directly correlates to safe handling of label 120 when a user removes the label 120 and applies the label 120 to a surface (an opening of an object or the object itself).

FIG. 1 illustrates an embodiment of combination 100 where a size, a location, and an orientation of die cuts for portion 111 ensure that the used portion of liner 110 (with a hole after portion 111 is removed from combination 100 with label 120) does not create printer feed issues in a printer during application of label 120 and do not damage tamper-evident die cuts 121 when label 120 with portion 111 are removed from combination 100 during application of label 120. The liner 110 adhered to label 120 is approximately 4.375 inches by 2.25 inches and label 120 is approximately 4 inches by 2 inches. The die cuts that define portion 111 in liner 110 extend out past a rightmost corner edge of label 120 so as to define areas 113 of portion 111 that are not in contact with a backside of label 120. Additionally, die cuts of portion 111 are adjacent and proximate to a rightmost corner edge of liner 110 so as to define areas 112.

Figure 2:
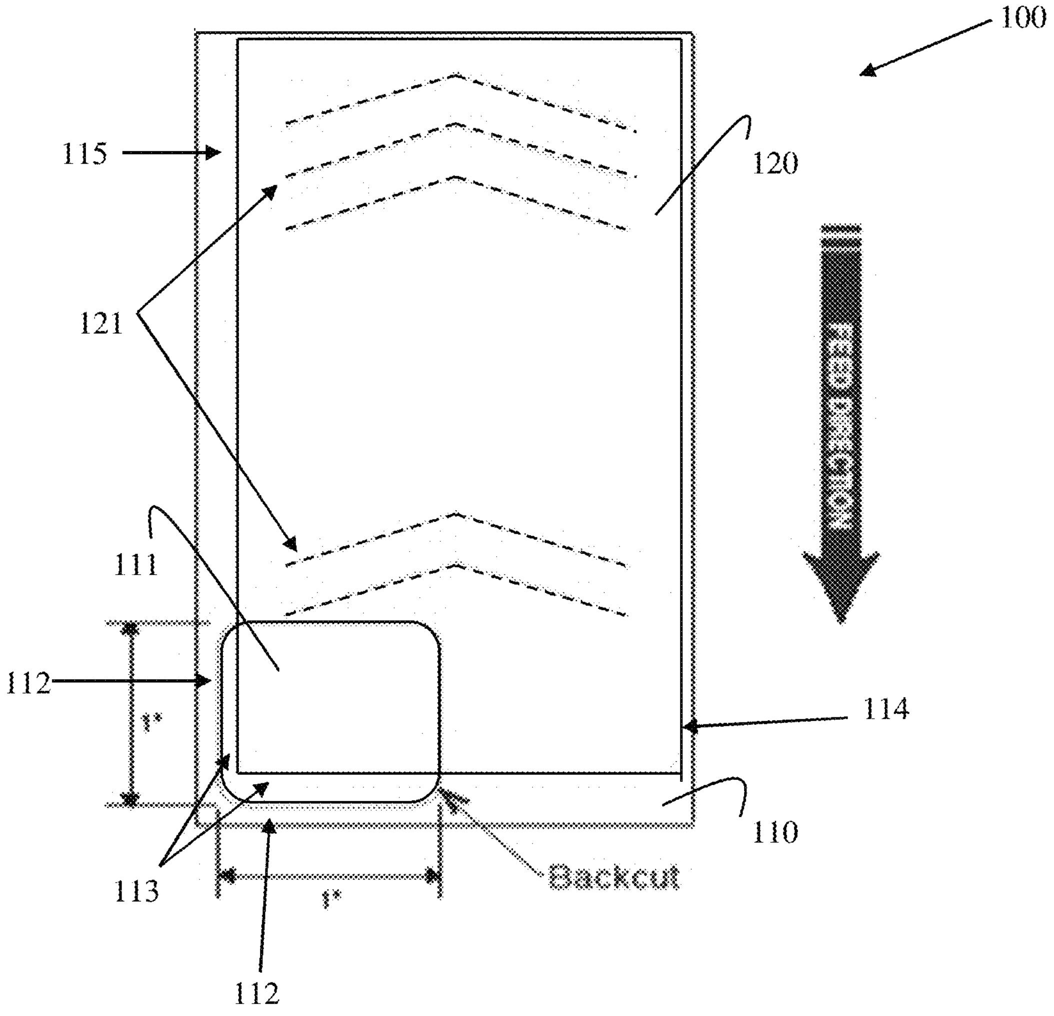
FIG. 2 is a diagram of another label-liner combination with a separation feature, according to an example embodiment.

FIG. 2 illustrates another embodiment of combination 100 with portion 111 situated to the leftmost edge of label 120 and liner 110. Portion 111 is approximately 1 inch by 1 inch. Area 113 of 111 extends past the leftmost edge of label 120 and area 112 is adjacent and proximate to leftmost edge of liner 110.

FIG. 2 also illustrates that portion 111 is placed/situated or oriented on an end of liner 110 that is closest to the feed path of a printer, which uses a roll of combination 100 and rewinds the used portion of liner 110 (with holes from removal of portion 111). This ensures that the hole created when removing portion 111 is nearest to the feed mechanism of the printer that is grasping liner 110 for winding the used portion of liner 110 into a discard roll.

Area 112 of used liner 110 is sufficient enough to ensure that both edges of the feed mechanism can grasp used liner 110 for feeding liner 110 into its discard roll after removal of portion 111.

Moreover, area 113 is sufficient enough that a user applying label 120 and removing label 120 with portion 111 can grasp area 113 while applying the label 120 to an object and peel portion 111 away from label 120 without tearing label 120 and without damaging any tamer-evident die cuts 121 during application of label 120 to an object.

In an embodiment, a first offset 115 between a first side of label 120 and a first side of liner 110 is greater than a second offset 114 between a second side of label 120 and second side of liner 110. This provides structural integrity to the waste liner in the waste liner after label 120 is removed from combination 100 with die cut portion 111 remaining attached to the removed label 120. In other words, the liner 110 or liner web (web or roll of liner 110) comprises a hole or aperture after portion 111 is removed with label 120. The distance or the offset 115 between the side of liner 110 and the side of label 120 is greater than the distance or offset 114 on the opposite side of liner 110 and label 120. This allows for added space 112 between an aperture edge of liner 110 that is defined when the portion 111 was removed and the side of the liner 110. This added space 112 when compared with 114 is greater which allows the waste liner to maintain integrity and remain in alignment when a printer's waste liner spooling mechanism winds the waste liner into a waste or recycle spool for subsequent discarding. In this embodiment, the alignment of a backside of label 120 is offset so as to not be centered onto the frontside of liner 110 when the combination 100 is formed or manufactured.

Figure 3:
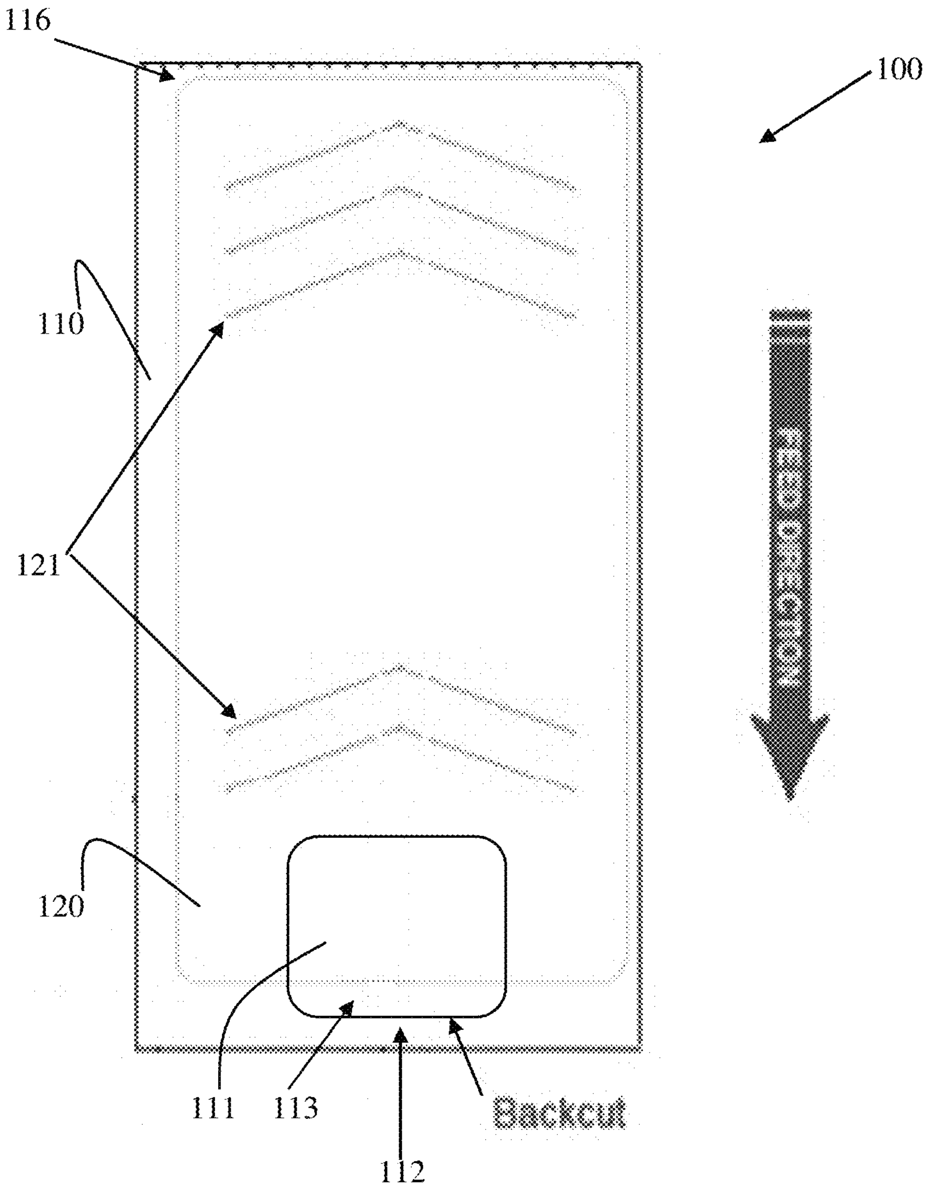
FIG. 3 is a diagram of another tamper-evident label, according to an example embodiment.

FIG. 3 illustrates yet another embodiment of combination 100 with portion 111 situated in substantially a center bottommost portion of label 120 and liner 110. Again, die cuts for portion 111 are adjacent and nearest to an end of liner 110 that is being fed into a printer's liner discard spool (used liner 110 with a hole after removal of portion 111 is next to or proximate to the feed mechanism for the used roll discard spool).

Although offsets 114 and 115 are not illustrated in FIG. 3 and it appears that label 120 is not centered onto liner 110 in FIG. 3, it is noted that in an embodiment offsets 114 and 115 may be equal such that label 120 is substantially centered on liner 110, since in the embodiment illustrated in FIG. 3, the sides of liner 110 will not be adjacent to the aperture created in liner 110 when portion 111 is removed with label 120 for application. However, notice that offset, area, or distance 112 adjacent to a bottom edge of liner 110 is greater than the offset, area, or distance 116. Again, this variation in offsets between complete centering of label 120 onto liner 110 is done to ensure that the aperture in liner 110 adjacent to the printer waste spool infeed mechanism is able to properly maintain contact with the waste liner and wind it into a waste or recycle spool for subsequent discarding.

Figure 4:
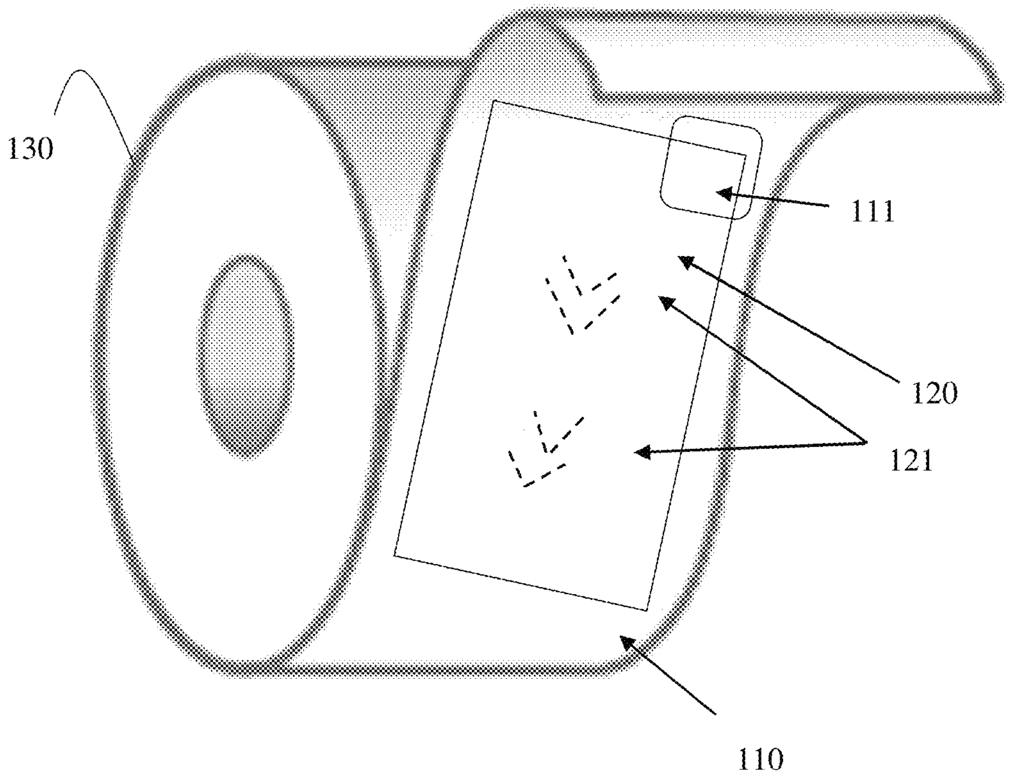
FIG. 4 is a diagram of a roll of label-liner combinations with a separation feature, according to an example embodiment.

FIG. 4 illustrates a roll 130 of combination 100. The roll is fed into a printer such that a starting end of roll 120 is supplied in the direction of the printer's feed path with portion 111 of liner 110 closest to and adjacent to starting end. Roll 130 comprises a plurality of combinations 100 having a single liner substrate 110 and a plurality of individually imaged/printed labels 120. Each combination 100 comprises a label 120 and die cuts for removable liner portion 111. Optionally, each label 120 comprises tamper-evident die cuts 121.

One now appreciates how label 120 provides a glove-friendly and handling feature, which permits each label 120 to be separated from a liner 110 along a remaining portion 111 of liner 110 without a user touching adhesive coated on a backside of label 120. Portion 111 provides a handling and non-adhesive component for separating label 120 and applying label 120 to an object. Area 113 allows removal of portion 111 after applying label 120 to the object without a user's gloved hand or ungloved hand engaging adhesive coated on the backside of label 120.

Moreover, the used portion of liner 110 can be fed back into a liner discard spool without causing printer malfunction because the used portion of liner 110 remains engaged with the fed mechanism and the dimensions, location, and orientation of a hole left in used liner 110 after portion 111 is removed ensures proper engagement and balance by the printer's feed mechanism.

In an embodiment, portion 111 is of a square shape, a rectangular shape, or a circular shape.

Figure 5:
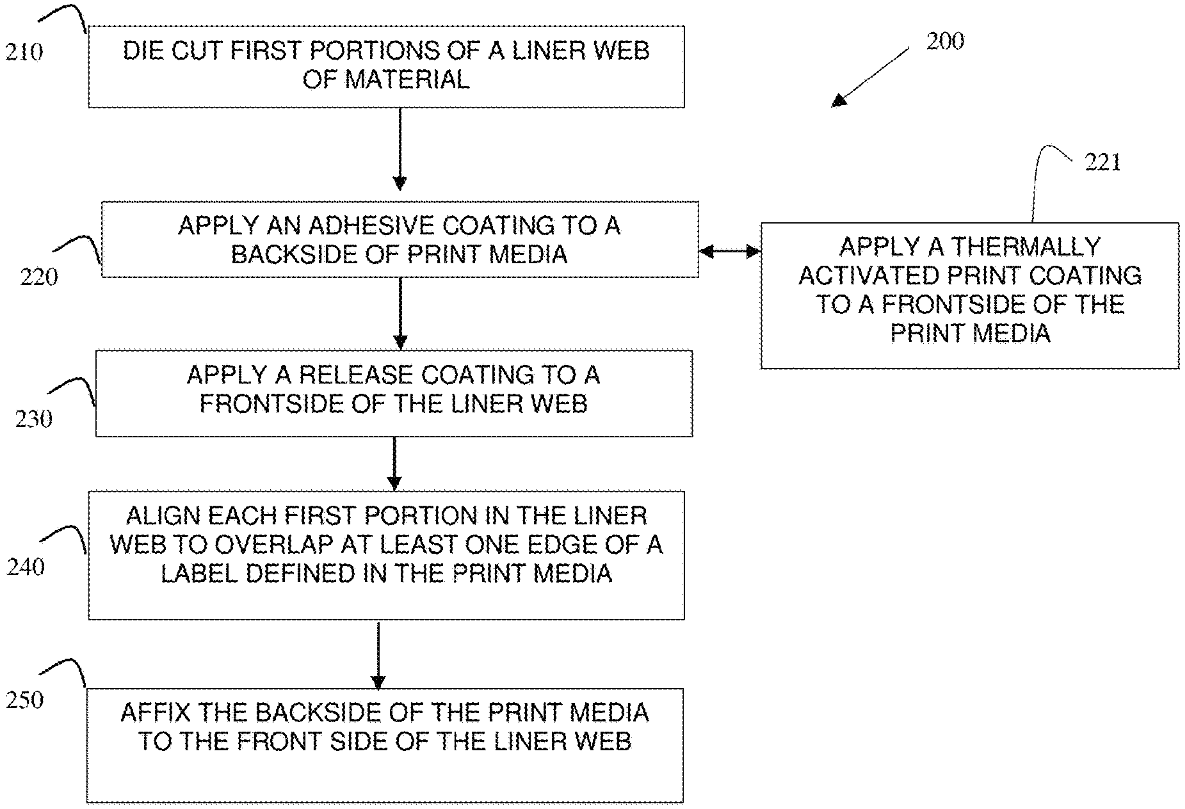
FIG. 5 is a diagram of a method of manufacturing a label-liner combination with a separation feature, according to an example embodiment.

FIG. 5 is a diagram of a method 200 of manufacturing combination 100, according to an example embodiment. The method 200 is implemented by a modified flexographic or "flexo" press, which includes electromechanical components driven by firmware or software. The firmware or software comprise executable instructions that are executed by a hardware processor associated with the flexo press from a non-transitory computer-readable storage medium. The processor may be embedded in the press or may be interfaced through a control board to the electromechanical components of the press, such that the processor can activate and deactivate the componentry of the press to manufacture sheets and/or rolls 130 of combination 100. Furthermore, the flexo press includes a variety of stations that apply the coatings, adhesives, and perform the die cuts to manufacture the liner 110 and label 120 discussed herein and above.

At 210, the press die cuts first portions 111 of a liner web of material 110.

At 220, the press applies an adhesive coating to a backside or print media.

In an embodiment, at 221, the press applies a thermally activated print coating to a frontside of the print media.

At 230, the press applies a release coating to a frontside of the liner web 110.

At 240, the press aligns each first portion 111 to overlap at least one edge of an individual label 120 defined in the print media.

At 250, the press affixes the backside of the print media to the frontside of the liner web 110 to form a roll 130 of combinations 100.

It is to be noted that the steps of the method 200 may be changed or arranged differently without departing from the embodiments discussed herein and above.

It is further to be noted that the press may utilize print media that was pre-manufactured with a layer or coating of the thermally activated print.

One now appreciates how label-liner combinations 100 provided as labels 120 and liners 110, in sheets and/or rolls 130 are manufactured and subsequently imaged by printers (dot matrix, laser, and/or thermal) with customized indicia for purposes of applying to surfaces associated with openings to items/objects and/or associated with packaging of objects. In some cases, labels 120 comprise tamper-evident die cuts 121, which cannot be removed from the corresponding surfaces of objects to which they are applied without being damaged, torn, or broken. Damaged labels 120 (torn or broken) provides visible evidence that the items/objects have been opened and/or that the objects have been accessed.

Further, the combinations 100 provide a health safety and glove friendly separation feature via die cut portions 111 ensuring that a user can remove label 120 and apply label 120 without digits of the user's operating hand touching adhesive coated on a backside of label 120 (portions 111 providing an adhesive-free region on a removed label 120 for handling).

Still further, dimensions, location, and orientation of portions 111 ensure that the waste liner comprising holes (for the removed portions 111) maintain proper structural integrity and alignment in the waste liner such that a printer's liner waste spool operations and waste spool infeed mechanism does not jam or otherwise malfunction while winding the waste spool after application.

The labels 120 and liners 110 in the combination 100 can be used in a variety of industry applications from package delivery, food preparation, hospitality, etc.

Although the present invention has been described with particular reference to certain preferred embodiments thereof, variations and modifications of the present invention can be affected within the spirit and scope of the following claims.

The invention claimed is:

1. A label-liner combination, comprising:

a liner;

a label; and a non-adhesive handling component;

wherein a backside of the label is adhered to a front side of the liner to form the label-liner combination with a first portion of the label aligned over a die cut portion in the liner when the label remains adhered to the front side of the liner;

wherein a bottom side of the die cut portion in the liner partially extends below a bottom side of the label and also extends beyond a rightmost or a leftmost side of the label, but the die cut portion does not extend to a bottom of the liner and does not extend to a rightmost or a leftmost side of the liner;

wherein the non-adhesive handling component is defined by the die cut portion of the liner that remains affixed to the backside of the label as a single label-liner combination after the label and the non-adhesive handling component are separated together from a remaining portion of the liner, wherein each non-adhesive handling component is a one square inch die cut in the corresponding liner;

wherein the remaining portion of the liner comprises a hole that remains in the liner after the single label-liner combination is separated from the remaining portion of the liner and wherein the remaining portion of the liner retains four unbroken sides with just the hole representing the missing non-adhesive handling component after the single label-liner combination is separated from the remaining portion of the liner;

wherein a backside of the non-adhesive handling component is free of any adhesive, and wherein the portion of the liner corresponding to the non-adhesive handling component is removable from the backside of the label to apply the label to a surface of an object.

2. The label combination of claim 1, wherein the label comprises one or more sets of additional die cuts that weaken the label along the additional die cuts to ensure that when the label is applied to an opening of the object or applied to the object, the label will tear or rip when an attempt is made to subsequently remove the label from the opening or the object.

3. The label of claim 1, wherein the die cut portion in the liner is partially aligned to the backside of the label along a bottom corner of the label.

4. The label of claim 1, wherein a first area associated with the die cut portion permits the label to be removed by one or more digits of a hand with the die cut portion remaining attached to the label after the label has been printed on or imaged by a printer.

5. The label of claim 4, wherein the first area associated with the die cut permits the one or more digits of the hand to affix the label to the surface or the object without the one or more digits of the hand touching the backside of the label, wherein the backside of the label comprises an adhesive coating.

6. The label of claim 5, wherein a second area associated with distances that the bottom side of the die cut portion extends below the bottom side of the label and extends beyond the rightmost or the leftmost side of the label permit the die cut portion to be peeled away from the label by the one or more digits of the hand without the one or more digits of the hand touching the adhesive coating on the backside of the label.

7. The label of claim 1, wherein a first offset between a first side of the label and a first side of the liner in the label-liner combination is greater than a second offset between a second side of the label and a second side of the liner in the label-liner combination when the label is adhered to the liner, wherein the die cut portion is located on the first side of the label and the first side of the liner.

8. The label of claim 1, wherein the die cut portion extends beyond a bottom edge of the label for a first distance and extends beyond a side edge of the label for a second distance, wherein the first distance is greater than the second distance.

9. The label of claim 8, wherein an area associated with an overlap between the label and the die cut portion is greater than area associated with a second area associated with the first distance and the second distance.

10. A roll of label-liner combinations, comprising:

a liner web of material;

a print media;

labels defined within the print media; and a non-adhesive handling component for each label;

wherein a backside of the print media is affixed to a frontside of the liner web and aligned to ensure that each label partially overlaps with a die cut portion made in the liner web;

wherein each label and a segment of the liner web comprising the corresponding die cut portion defines a single label-liner combination;

wherein each non-adhesive handling component is defined by the corresponding die cut portion of the liner web that remains affixed to the corresponding label when the corresponding label is separated from a corresponding remaining portion of the liner web;

wherein each remaining portion of the liner web comprises a hole that remains in the corresponding remaining portion of the liner web when the corresponding non-adhesive handling component and the corresponding label are removed together as a corresponding single label-liner combination from the liner web and wherein each remaining portion of the liner web retains four unbroken sides with just the corresponding hole for the corresponding missing non-adhesive handling component after the corresponding single label-liner combination is separated from the corresponding remaining portion of the liner web;

wherein a bottom of each non-adhesive handling component extends beyond a bottom of the corresponding label within the corresponding portion of the liner web and each non-adhesive handling component also extends beyond a rightmost or a leftmost side of the label, but the non-adhesive handling component does not extend to a bottom of the corresponding liner web and does not extend to a rightmost or a leftmost side of the corresponding liner web, and wherein the corresponding remaining portion of the liner web includes the four unbroken sides after the corresponding portion in the liner web is removed for the corresponding non-adhesive handling component;

wherein a backside of each non-adhesive handling component is free of any adhesive, and wherein each portion of the liner web corresponding to a corresponding non-adhesive handling component is removable from a corresponding backside of the corresponding label to apply the corresponding label to a surface of an object.

11. The print media of claim 10, wherein each die cut portion extends beyond at least one edge of the corresponding label within the liner web by at least a first distance for which there is no overlapping relationship.

12. The print media of claim 11, wherein for each label-liner combination, a first offset between a first side of the corresponding label and a first side of the corresponding segment of the liner web is greater than a second offset between a second side of the corresponding label and a second side of the corresponding segment of the liner web, and wherein the corresponding die cut portion is located on the first side of the corresponding label and the first side of the corresponding segment of the liner web.

13. The print media of claim 10, wherein a frontside of the print media comprises a thermally activated print coating.

14. The print media of claim 13, wherein the backside of the print media comprises an adhesive coating and the frontside of the liner web comprises a release coating.

* * * * *